United States Patent [19]

Dougall

[11] 4,225,200
[45] Sep. 30, 1980

[54] GREASE AND CUP RETAINED UNITIZED THRUST BEARING AND METHOD OF MAKING SAME

[75] Inventor: Robert K. Dougall, Grand Haven, Mich.

[73] Assignee: Keene Corporation, New York, N.Y.

[21] Appl. No.: 929,656

[22] Filed: Jul. 31, 1978

[51] Int. Cl.$^2$ .............................................. F16C 33/00
[52] U.S. Cl. .............................. 308/235; 29/148.4 A; 29/423; 29/724; 206/318; 308/219; 308/234
[58] Field of Search ............... 308/212, 213, 219, 227, 308/229, 230, 231, 232, 233, 234, 235; 29/148.4 R, 148.4 A, 423, 724, 725; 206/318

[56] References Cited

U.S. PATENT DOCUMENTS

| | | | |
|---|---|---|---|
| 1,907,015 | 5/1933 | Swart | 206/318 |
| 1,982,932 | 12/1934 | Scribner | 206/318 |
| 2,031,417 | 2/1936 | Ketcham et al. | 29/724 |
| 2,055,524 | 9/1936 | Ellis | 308/235 |
| 3,240,543 | 3/1966 | Benson | 308/235 |
| 3,900,235 | 8/1975 | Alling et al. | 308/235 |
| 3,937,541 | 2/1976 | Alling et al. | 308/235 |

FOREIGN PATENT DOCUMENTS 216350  5/1924  United Kingdom ..................... 308/233

Primary Examiner—Charles E. Frankfort
Attorney, Agent, or Firm—Price, Heneveld, Huizenga & Cooper

[57] ABSTRACT

A thin roller thrust bearing assembly including first and second annular races, an annular roller separator and a plurality of rolling elements is provided with a grease retained assembly, an outer banding cup or a combination thereof. In a purely grease retained assembly, a coating of tacky grease secures together first and second annular races with an annular roller separator and a plurality of rolling elements retained therebetween. The grease retained assembly provides a stable package for shipping and handling of the bearing. Alternately, an outer banding cup secures the first annular race and the annular roller separator with the rolling elements retained therebetween. In this case, the second annular race is secured to the annular roller separator and the rolling elements with a coating of tacky grease. Alternately, the outer banding cup encompasses both the first and second annular races with an annular roller separator and a plurality of rolling elements retained therebetween. Each of these bearing assemblies can be provided with a unitized bearing construction involving the use of an annular roller separator which restrains the rolling elements in only one axial direction.

21 Claims, 6 Drawing Figures

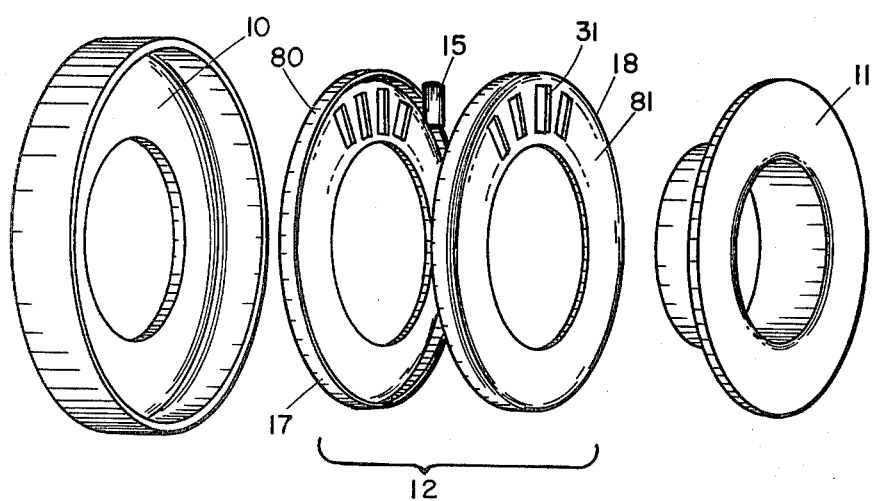
FIG 1
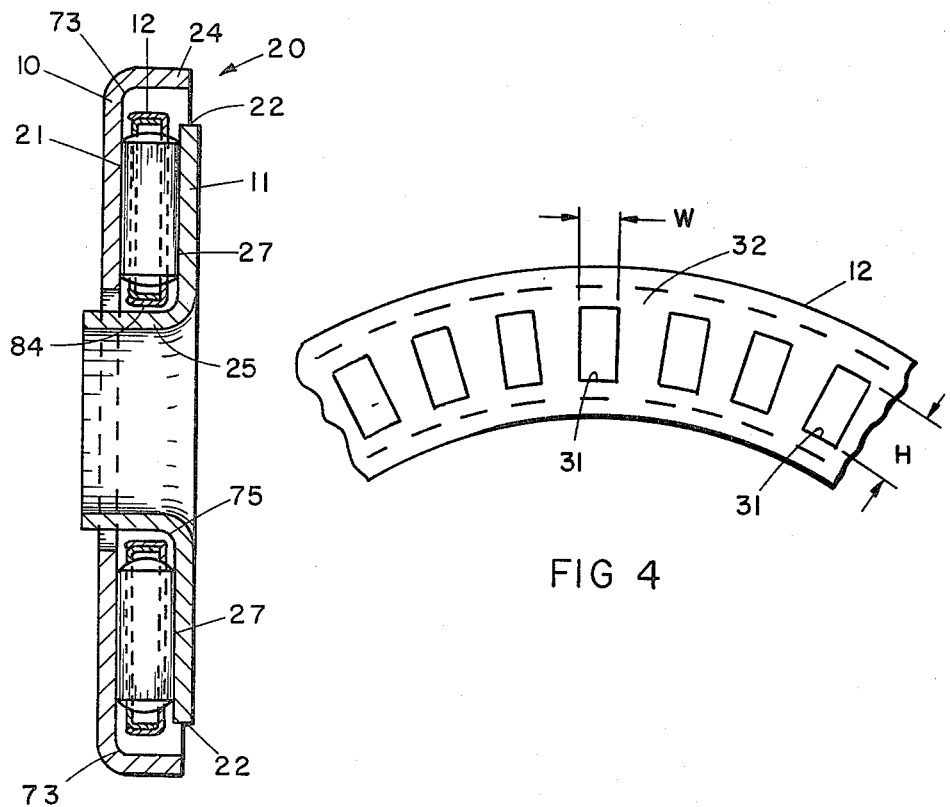
FIG 2
FIG 4

GREASE AND CUP RETAINED UNITIZED THRUST BEARING AND METHOD OF MAKING SAME

BACKGROUND OF THE INVENTION

This invention relates generally to roller thrust bearings. More particularly, the invention provides a new and improved thin roller thrust bearing assembly for use in an automotive automatic transmission or the like.

In an automatic transmission or similar device, relatively thin, highly loaded thrust bearings are required between the working members of the device. In the conventional automatic transmission, an impeller, one or more turbines, and a stator form a torus shaped container containing a fluid which transmits torque from the impeller to the turbines and to the drive shaft of the vehicle when the impeller is rotated by the engine. In such a device, the rotating, working members rotate at relatively high relative velocities with centrifugal force and hydrostatic pressure creating unavoidably heavy thrust between relatively rotating members. However, at the same time, because of space limitation, the thrust bearings must be relatively thin. In the gear box the helical gears of the planetary gear system of the conventional automatic transmission create the same operating conditions and present another application for the bearing of the present invention.

Typically, in the prior art, these thrust bearings comprise first and second annular races with a plurality of rolling elements and an annular roller retaining cage disposed therebetween. Since a relatively large number of these bearings normally are necessary in an automotive transmission assembly, recent development in these types of bearings has been directed to reducing bearing cost, rather than improving bearing performance. For example, these bearings are now assembled from stamped or drawn metal parts whenever possible. Typically, the first and second annular races are flat, stamped, or drawn members, including an axially projecting flange on the inner or outer diameter of the race. The annular cage is comprised of first and second ring-shaped, stamped or drawn cage members which interlock, retaining a plurality of rolling elements therebetween.

In these prior art thrust bearing assemblies, it has always been considered necessary to additionally provide means for mechanically retaining or binding together the assembly. In some cases this comprised an outer banding cup encompassing first and second flat annular races. However, the banding cup in this prior art bearing configuration, besides requiring an extra part in the forming operation, interfered with the flow of lubricant to the assembly. Alternatively, the raceways were provided with complimentary L-shapes when viewed in cross section, having projections on the edges of the flanges of each raceway. The complimentary L-shaped raceways having flanges and projections were forced over the cage with the cage and the projections forming an interference fit preventing separation of the races.

Problems with this latter type of assembly employing flanges and projections to mechanically secure the bearing assembly include accidental separation of the assembly and manufacturing problems associated with forming the projections on a stamped or drawn metal part. Tooling limitations dictate that the projections be formed or stamped with working members approaching the race from the axial direction. Thus, the flanges must be formed on the race in a stamping or drawing process that takes place after the formation of the projections. However, the stamping die must then be relieved to allow for the passage of the projections. Because of this, the die, which creates the flanges, produces flanges having a non-uniform radius and distorted raceways. Solutions to this problem have included the steps of coining the roller pathway to remove distortions and providing a relief hole in the raceway immediately adjacent the projections to reduce distortion during the drawing process. These steps, particularly the coining step, have proved expensive and still have not completely solved the problem of providing a stamped metal raceway having an undistorted roller pathway.

Various methods have been employed over the years to retain radial bearing assemblies. These methods have included grease retention of radial bearing assembly components. However, relatively thin roller thrust bearings of the type herein described for use in an automotive automatic transmission, have never been grease retained. These bearings have always been mechanically retained in the axial direction at some expense and difficulty.

SUMMARY OF THE INVENTION

A thin roller thrust bearing assembly is provided including first and second annular races with an annular roller separator and a plurality of rolling elements therebetween. According to the method of the present invention, the bearing assembly is provided with a coating of tacky grease for securing bearing components and providing a stable package for shipping and handling of the bearing. Alternately, a deformable banding cup rotatably secures the first annular race and the annular roller separator with the rolling elements retained therebetween. In this case, a second annular race is secured to the annular roller separator and the rolling elements with a coating of tacky grease. Alternatively, the outer deformable banding cup encompasses first and second annular races L-shaped in cross section with the annular roller separator and a plurality of rolling elements retained therebetween. By eliminating the projections employed to mechanically secure prior art bearing assemblies, the assembly method of the present invention provides for the manufacture of stamped or drawn metal races having undistorted roller pathways. Grease retained bearing assemblies are inherently less expensive to manufacture than bearings assembled with prior art assembly methods. Once installed in an automatic transmission, the grease that retains the bearing assembly during shipping and handling is washed away by the transmission fluid so that the bearing can be lubricated by the normal circulation of transmission fluid. Additionally, the assembly method may include the steps of manufacturing a unitized bearing wherein an annular roller separator is provided which retains the rollers in only one axial direction. Such a unitized thrust bearing assembly further reduces manufacturing costs of the bearing.

The bearing constructed according to the present invention comprises first and second annular races, an annular roller separator, a plurality of rolling elements disposed in the annular roller separator, means for concentrically aligning the first annular race, the second annular race and the annular roller separator, and a coat of tacky grease therebetween. The grease secures together the bearing components to provide a stable assembly for shipping and handling of the bearing. Means for concentrically aligning the first and second annular races and the annular roller separator include axially extending flanges on the outer and inner diameters of the first and second annular races, respectively. The bearing may be unitized by providing an annular roller separator, channel shaped in cross section, including a plurality of roller receiving slots having a width less than the major diameter of the rolling elements. In another embodiment of the invention, the first annular ring and the annular roller separator may be rotatably secured together by a deformable banding cup, with the second annular race secured thereto with a coat of tacky grease. In still another embodiment of the invention, the deformable banding cup encompasses first and second annular races having L-shaped cross sections with the annular roller separator and the rolling elements retained therebetween.

BRIEF DESCRIPTION OF THE DRAWINGS

FIG. 1 is an exploded assembly of a bearing constructed according to the present invention.

FIG. 2 is an elevational view, partially in section, of a bearing constructed according to the present invention.

FIG. 4 is a plane view of a section of an annular roller separator constructed according to the present invention.

DESCRIPTION OF THE PREFERRED EMBODIMENT

Figure 6:
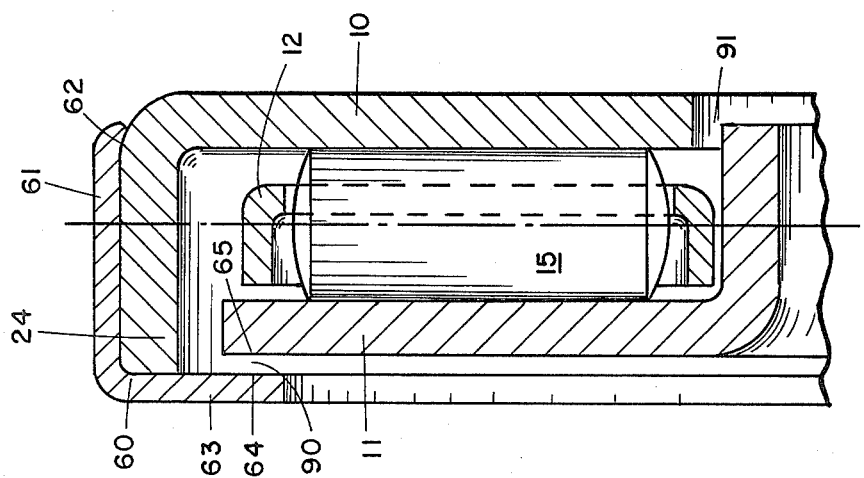
FIG. 6 is a partial elevational view, partially in section, of another embodiment of the invention.

Referring to FIG. 1, an exploded assembly of a bearing constructed according to the present invention is illustrated. The embodiment of the invention illustrated in FIG. 1 is suitable for assembly with either pure grease retention or a deformable banding cup. The bearing assembly includes a first annular race 10, a second annular race 11, an annular roller separator 12 and a plurality of rolling elements 15 disposed in the annular roller separator 12. In this case, the annular roller separator 12 comprises a cage including first and second ring-shaped cage halves 17 and 18. As best illustrated in FIG. 4, the rolling elements 15 are seated in the slots 31 of the cage halves which slots have a width W and a height H slightly smaller than the major diameter and the height, respectively, of the rolling elements so that the rolling elements 15 are retained between cage halves 17 and 18. As will presently be described, an annular roller separator 12 which provides a unitized bearing construction may be provided. The rolling elements 15 can be either spherical or square ended.

METHOD

Referring now to FIG. 2, the method of making a grease retained thrust bearing 20 will be described. The grease retained assembly method comprises the step of assembling a first annular race 10, an annular roller separator 12 and a plurality of rolling elements with a first coat of tacky grease therebetween. The first coat of grease is disposed within the envelope described by the flange 24 of race 10 in any suitable manner such that it extends along the roller pathway 21 of the race 10 when the bearing 20 is assembled. Preferably the method further includes the step of assembling the second annular race 11 to the annular roller separator 12 and the rolling elements 15 with a second coat of tacky grease therebetween. The second coat of grease is disposed within the envelope described by the flange 25 and the circumferential edge 22 of the race 11 in any suitable manner such that it extends along the roller pathway 27 of the race 11 when the bearing 20 is assembled. Because of the tacky nature of the grease and the large surface area of the annular races and annular roller separator, the grease retained bearing provides a stable package for shipping and handling of the bearing at temperatures up to 150° F. It is to be understood that in its most basic form, the method of the present invention contemplates the assembly of the annular roller separator and the rolling elements to only one of either the first or second annular races 10 and 11, respectively, since either of these races may be replaced by roller pathways in the environment of the bearing as installed. In these cases, the bearing is shipped with only one raceway attached, since the second raceway is provided by a structure in the device in which the bearing is installed.

Preferably, the first race 10, the annular roller separator 12, and the second race 11 are stamped or drawn metal parts. The first and second annular races 10 and 11 are normally provided with first and second axially projecting flanges 24 and 25 on the outer and inner diameters of the first and second annular races, respectively. Since the need for projections on the first and second flanges 24 and 25 is eliminated, roller pathways at 21 and 27 on the first and second annular races 10 and 11, respectively, may be formed without distortion in a single stamping or drawing operation.

Figure 3:
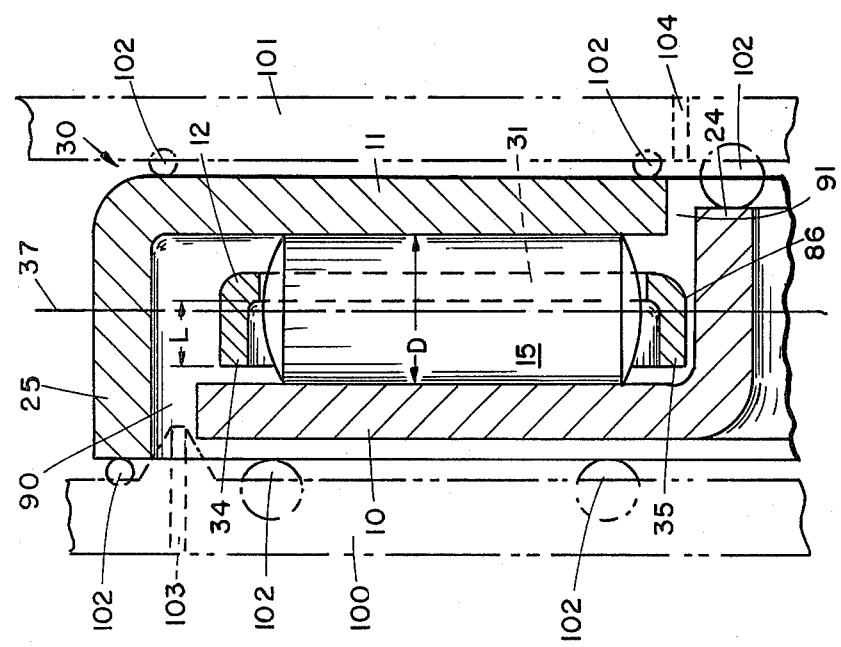
FIG. 3 is a partial elevational, partially in section, view of another embodiment of the invention.

Referring now to FIGS. 3 and 4, it is illustrated that the method of the present invention contemplates provision of a grease retained unitized bearing assembly 30. In forming a unitized bearing assembly the step of stamping the annular roller separator 12 includes the steps of providing a plurality of roller receiving slots or openings 31, best illustrated in FIG. 4. The slots 31 are stamped in a radial face 32 of the annular roller separator 12. The roller receiving slots 31 are radially disposed in an angularly spaced relationship about the annular roller separator 12. The method further includes the steps of forming third and fourth axially projecting flanges 34 and 35 on the outer and inner diameters of the annular roller separator 12. The third and fourth axially projecting flanges 34 and 35 extend axially a distance L which is approximately equal to or slightly greater than one half the major diameter D of the rolling elements 15. This places the roller receiving slots 31 to the side of the rolling axis 37 of the rolling elements 15. The roller receiving slots 31 are provided with a width W, best illustrated in FIG. 4, which is slightly less than the major diameter D of the rolling elements 15. The height H of the slots 31 is slightly less than the height of the rollers 15. An annular roller separator 12 so formed is said to form a unitized bearing since it restrains movement of the rollers 15 in only one direction. Thus, if the first annular race 10 is removed, and the annular roller separator 12 is grease retained or otherwise secured to the second annular race 11, the rolling elements 15 are retained therebetween. In the opposite case, where the second annular race 11 is removed, the rolling elements 15 are unrestrained.

The method of assembling the unitized greased retained thrust bearing 30 involves the steps of providing a unitized annular roller separator 12 and a plurality of rolling elements 15. The rollers 15 are assembled into their respective slots 31 which lie in the envelope defined by flanges 34 and 35. A first annular race 11 is then provided and this first annular race is adhered to the roller elements 15 and the separator 12 by means of a coat of tacky grease disposed on said race circumferentially in area 27. In subsequent steps of the method a second annular race 10 is provided and added to the assembly by applying an additional quantity of tacky grease circumferentially to either the area 21 of the second annular race 10 or to the roller separator 12 and rollers 15 and pressing the first annular race 10, the roller separator 12, the rolling elements 15 and the second annular race 11 together to form a stable assembly.

An alternate method of assembly for any of the embodiments herein disclosed involves assembling the entire bearing 30 dry, and injecting the coat of tacky grease into the bearing assembly. This may be accomplished by sandwiching the bearing 30 between platens 100 and 101 illustrated in phantom in FIG. 3. The platens 100 and 101 include a plurality of elastomer o-rings 102 in sealing engagement with the bearing 30. A coat of tacky grease is then injected to the assembly through aperture 103. Excess grease and displaced air escape the assembly at 104.

Figure 5:
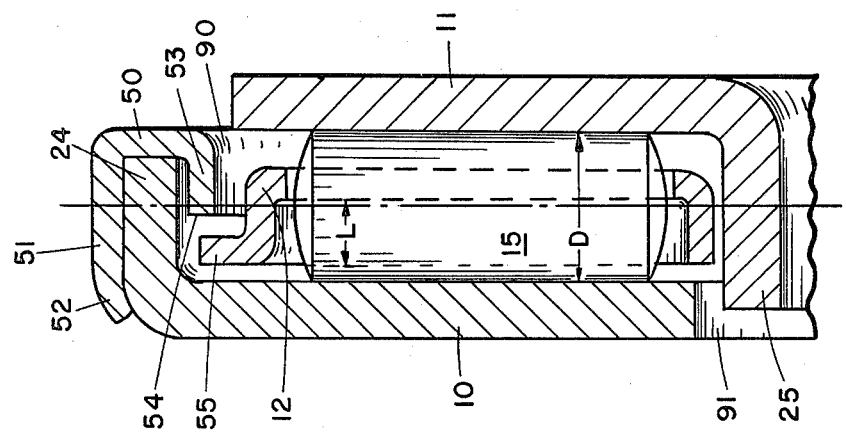
FIG. 5 is a partial elevational view, partially in section, of another embodiment of the invention.

Referring now to FIG. 5, alternately, the method of the present invention contemplates provision of a cup and grease retained, unitized bearing structure involving the steps of forming a unitized bearing structure with an annular deformable banding cup 50 which rotatably secures an annular roller separator 12 to a first annular race 10. This unitized bearing structure may be used in conjunction with an existing roller pathway but preferably, in subsequent steps of the assembly method, a second annular race 11 is secured to the annular roller separator 12 and the rolling elements 15 with a coat of tacky grease in the manner previously described with respect to the embodiment of FIG. 2. A unitized bearing structure is provided by forming an annular roller separator 12 according to the steps previously described with respect to the embodiment of FIG. 3. In this case however, the separator 12 includes a radially extending flange 55 and the separator 12 is mechanically retained to the first annular race 10 by deformable banding cup 50. In this embodiment the banding cup 50 preferably comprises an annular member C-shaped in cross section which fits over and is secured to the first axially extending flange 24 of the first annular race 10. One leg 51 of the C-shaped in cross section, cup 50, is spun around the first annular race 10 at 52. The second leg 53 of the C-shaped in cross section deformable cup 50, includes a radial face 54 which cooperates with a radially extending flange 55 formed integrally with the annular roller separator 12.

Referring now to FIG. 6, alternately, the method of assembly contemplates the use of a deformable banding cup 60 that encompasses first and second annular races 10 and 11, respectively, having complementary L-shaped cross sections. In this case, the cup 60 is L-shaped in cross section, including a leg 61 which is spun about the first annular race 10 at 62. The second leg 63 of the deformable cup 60 defines a radially extending face 64 which cooperates with the periphery of the second annular race 11 at 65 to rotatably secure together the first and second annular races with the annular roller separator 12 and the rolling elements 15 retained therebetween.

The annular roller separator 12 particularly in unitized bearing constructions is subjected to the Tufftride process or is carbonitrided, the Tufftride process is preferred. Tufftride is a trademark identifying a proprietary low temperature salt bath nitriding process that substantially upgrades surface hardness, wear and fatigue charateristics of all ferrous metals. The exclusive license for the process in the United States and Canada is held by the Kolene Corporation. The Tufftride process is covered by SAE specification AMS 2755A "Liquid Salt Bath Nitriding" issued Jan. 15, 1963 and revised Mar. 15, 1966.

Carbonitriding is a modification of the gas carburizing process which is normally used to add carbon to the surface of a hardenable steel. In carbonitriding, anhydrous ammonia gas is added to the furnace atmosphere to cause both carbon and nitrogen to be absorbed by the surface of the steel. The process is also known as dry cyaniding, gas cyaniding, nitro carburizing, and ni-carbing. The Tufftride process is preferred since only a shallow case depth is required and less distortion occurs with the Tufftride process.

The roller separator 12 is subjected to the Tufftride process or is carbonitrided since in the unitized bearing construction the annular roller separator 12 may come in contact with the first or second annular races 10 or 11 which are made of a through hardened steel. In the embodiment of FIG. 5, it may also be desirable to subject the banding cup 50 to the Tufftride process since the radial face 54 of the cup 50 may contact the radially extending flange 55 of the annular roller separator. The Tufftride process does not interfere with the deformation of the leg 51 and cup 50 in the spinning operation.

The grease employed in the grease retained assembly methods remains sufficiently tacky or sticky in a temperature range from 125° to 150° F. to provide a stable package for shipping and handling of the bearing. Furthermore, where the bearing is used in an automotive automatic transmission, the grease is compatible with the automatic transmission fluid. A grease suitable for use in the grease retained assembly method is commercially available from the Texaco Oil Company and is known as Texaco Marfak HD-3 grease. Specifications of this grease are as follows:

Soap Base: Sodium
Soap %: 18.0
Worked Penetration at 77° F.: 230
Dropping Point: 425°
Water %: 0.20
Mineral Oil %: 81.0
Viscosity of Mineral Oil SSU @ 100° F.: 1445
SSU @ 210° F.: 93
Pour Point of Mineral Oil: +30° F.

Texaco Marfak HD-2 grease conforms the military specification VV-G-632 Type A, Grade 2. The HD-2 grease is one grade lighter in consistency than the HD-3 grease which is not specifically covered by a Military Specification Number.

Referring now to FIG. 2 it should be clear that the grease and/or cup retention methods of the present invention provide for first and second annular races 10 and 11 formed with undistorted roller pathways 21 and 27. These roller pathways may be formed undistorted in a single stamping operation along with axially extending flanges 24 and 25, since the absence of projections normally used to secure the bearing assembly in the prior art allows the use of a solid die unbroken by relief channels conventionally used to clear the projections. This produces first and second annular races 10 and 11 having first and second axially projecting flanges 24 and 25 with undistorted, uniform radiuses at 73 and 75.

APPARATUS

Referring again to FIGS. 1 and 2, the thin roller thrust bearing constructed according to the present invention will be described in further detail. The bearing 20 of FIG. 2 is a grease retained thrust bearing comprising at least one annular race. Preferably, first and second annular races 10 and 11, respectively, are provided having inner and outer diameters. The bearing further includes means for concentrically aligning the races and the annular roller separator. In this case, means for concentrically aligning the annular races and the annular roller separator comprises first and second axially extending flanges 24 and 25 disposed on the outer and inner diameters of the first and second annular races 10 and 11, respectively. In this case, the annular roller separator 12 is provided with an inner diameter, defined by the surface 84, approximately equal or slightly greater than the outside diameter of the second axially projecting flange 25 of second annular race 11 to provide a bore guided annular roller separator 12. However, it is also possible to guide the annular roller separator 12 with first axially projecting flange 24 or to allow the roller separator to float between flanges 24 and 25. As previously discussed with respect to the assembly method of the present invention, the bearing 20 normally includes both first and second annular races 10 and 11 secured together with first and second coats of tacky grease, the annular roller separator 12 and the rolling elements 15 retained therebetween. Preferably the first and second annular races 10 and 11 and the annular roller separator 12 are of stamped sheet metal construction.

The bearing 20, illustrated in FIG. 2, does not feature unitized construction but rather is provided with a cage type annular roller separator 12 best illustrated in FIG. 1. In this case, the annular roller separator 12 comprises a cage including first and second ring shaped cage halves 17 and 18. The cage halves define first and second radially extending faces 80 and 81. A plurality of roller receiving openings or slots 31 are disposed in an angularly spaced relationship about the first and second radial faces 80 and 81. The roller receiving openings or slots 31 are smaller than rolling elements 15 so that when cage halves 17 and 18 are joined together, fixing the first and second radially extending faces 80 and 81 in an axially spaced relationship, the rolling elements 15 are securely retained therebetween extending through the roller receiving openings to contact roller pathways on the first and second annular races 10 and 11.

However, referring now to FIG. 3, it is illustrated that the grease retained thrust bearing may be provided with a unitized type roller separator. The unitized roller separator is a one piece annular member that may be formed in a single stamping. In the unitized construction, the annular roller separator 12 is provided with third and fourth axially projecting flanges 34 and 35 and a plurality of roller receiving openings or slots 31, best illustrated in FIG. 4. As previously described with respect to the method of forming the unitized annular roller separator, the third and fourth axially projecting flanges 34 and 35 are provided with a length L equal to or slightly greater than one half the major diameter D of the rolling element 15. The roller receiving openings 31 are provided with a width W that is slightly less than the major diameter D of the rolling element 15. The height of the roller receiving slots 31 is slightly less than the height H of the rolling elements 15. The fourth axially extending flange 35 of the annular roller separator 12 has an inside diameter, defined by the face 86, that is equal or slightly greater than the outside diameter of the second axially extending flange 25 of the second annular race 11 to provide a bore guided annular roller separator 12, however, outside diameter guided or floating separators may also be used.

Referring now to FIG. 5, a cup and grease retained thin unitized roller thrust bearing is illustrated. In the embodiment of the invention illustrated in FIG. 5, the annular roller separator 12 provides a unitized construction as previously described with respect to the embodiments of FIGS. 3 and 4. However, in this case, the annular roller separator 12 is additionally provided with a radially extending flange 55. The radially extending flange 55 cooperates with a radially exending face 54 on leg 53 of a C-shaped in cross section, deformable banding cup 50. The annular cup 50 fits over first axially projecting flange 24 of the first annular race 10 and is secured thereto by spinning of the bearing assembly and deformation of the leg 51 of the cup 50 around the first annular race 10 at 52.

Whereas the first and second annular races 10 and 11 are stamped from a through hardenable bearing race quality steel, the relatively soft or ductile cup 50 is stamped from a steel that is easily worked or deformed. With the cup 50 secured to the first annular race 10, interference between the radially projecting flange 55 of the annular roller separator 12 and radially extending face 54 of the annular cup 50 rotatably secures the annular roller separator 12 within the first annular race 10 against axial separation. Since the annular roller separator 12 provides a unitized bearing construction, the rolling elements 15 are securely retained between the annular roller separator 12 and the first annular race 10. Such an assembly, including the first annular race 10, the annular cup 50, the annular roller separator 12 and the rolling elements 15 provide a stable bearing assembly for applications where the roller pathway provided by the second annular race 11 is provided by structural members in the environment of the bearing as installed. However, as a practical matter, and particularly where such a bearing is emloyed in an automatic transmission, it is preferable to provide the bearing assembly with a second annular race 11, including a second axially projecting flange 25. In this case, the second angular race 11 is secured to the annular roller separator 12 and the rolling element 15 by a coat of tacky grease according to the grease retention assembly method previously described. Again, a bore guided annular roller separator 12 is shown but outside diameter guided and floating separators may be used.

Referring now to FIG. 6, an embodiment of the invention is illustrated wherein a deformable banding cup 60 is provided that encompasses both the first and second annular races 10 and 11. In the embodiment of FIG. 6, an annular roller separator 12 is illustrated which provides a unitized bearing construction. However, it should be understood that the embodiment of the invention illustrated in FIG. 6 may alternately be provided with a cage type annular roller separator such as the one illustrated in the embodiments of FIGS. 1 and 2. In this embodiment the deformable banding cup 60 is L-shaped in cross section. The cup 60 is secured to the first axially projecting flange 24 of first annular race 10. Preferably the deformable banding cup 60 is secured to the first annular race 10 by spinning and deformation of the leg 61 of the cup 60 around first annular race 10 at 62. The radially extending end 63 of the L-shaped deformable cup 60 defines a radial face 64 which engages the periphery of second annular race 11 at 65 to prevent axial separation of the assembly while allowing the race 11, separator 12 and rolling elements 15 to freely rotate.

In both of the embodiments of FIG. 5 and FIG. 6, the deformable cups 50 and 60 are stamped members defining at least one preformed radial face for engaging a rotating bearing structure and retaining together the bearing assembly. In both cases, an axially projecting flange is provided which fits over the first axially projecting flange 24 of the first annular race 10 and is secured thereto by suitable means such as spinning of the assembly and deformation of the end of the deformable cup. The deformable banding cup of the present invention provides a method of securely retaining the bearing assembly in a mechanical fashion wherever grease retention is thought to be unsuitable. However, the bearing assemblies of FIGS. 5 and 6 avoid the lubrication problems heretofore experienced with prior bearings of these types employing an outer banding cup. By employing the banding cup in conjunction with the first and second axially extending flanges 24 and 25, it is possible to provide clearances at 90 and 91 in both of the bearing assemblies of FIGS. 5 and 6 to allow for the circulation of lubricating fluid.

The above description should be considered as exemplary and that of the preferred embodiment only. The true spirit and scope of the present invention should be determined by reference to the appended claims. It is desired to include within the appended claims, all modifications that come within the proper scope of the invention.

The embodiments of the invention in which an exclusive property or privoilege is claimed are defined as follows:

1. A grease retained thrust bearing for use in an automotive automatic transmission comprising:
   a first generally flat annular race having inner and outer diameters;
   a generally flat annular roller separator having inner and outer diameters;
   means for concentrically aligning said first annular race and said annular roller separator;
   a plurality of rolling elements disposed in said annular roller separator; and
   a first coat of fibrous, tacky, adhesive-like grease therebetween, said first coat of grease being compatible with the working fluid of an automotive automatic transmission, said first coat of grease adhesively securing together said first annular race, said annular roller separator and said rolling elements, thereby providing a stable assembly for shipping and handling of the bearing.

2. The bearing of claim 1 further including:
   a second generally flat annular race having inner and outer diameters;
   a second coat of said grease for securing said second annular race to said annular roller separator and said rolling elements; and
   means for concentrically aligning said second annular race and said annular roller separator.

3. The thrust bearing of claim 2 wherein:
   said means for concentrically aligning said first annular race and said annular roller separator comprises an axially projecting flange disposed on the outer diameter of said first annular race.

4. The thrust bearing of claim 1 wherein
   said means for concentrically aligning said first annular race and said annular roller separator comprises an axially extending flange disposed on the outer diameter of said first annular race.

5. A grease retained thrust bearing for use in an automotive automatic transmission comprising:
   a first generally flat annular race having inner and outer diameters;
   a first axially projecting flange disposed on the outer diameter of said first annular race;
   a generally flat annular roller separator having inner and outer diameters;
   a plurality of rolling elements disposed in said annular roller separator;
   a generally flat second annular race having inner and outer diameters;
   a second axially projecting flange disposed on the inner diameter of said second annular race; and
   a coat of fibrous, tacky, adhesive-like grease; said coat of grease being compatible with the working fluid of an automotive automatic transmission, said grease adhesively securing together said first and second annular races with said annular roller separator and said rolling elements therebetween, thereby providing a stable assembly for shipping and handling of the bearing.

6. The bearing of claim 5 wherein said annular roller separator comprises:
   a cage;
   said cage including first and second ring-shaped cage halves;
   said cage halves including first and second radially extending faces;
   a plurality of roller receiving openings radially disposed in an angularly spaced relationship about said first and second faces;
   said rolling elements larger than said roller receiving openings; and
   said cage halves being joined with said first and second faces in an axially spaced relationship with said rolling elements retained therebetween, and extending through said roller receiving openings.

7. The bearing of claim 5 wherein said annular roller separator comprises:
   a ring-shaped separator member;
   said ring-shaped separator member having a channel-shaped cross section; and
   a plurality of roller receiving slots radially disposed in an angularly spaced relationship about said ring-shaped separator member.

8. The bearing of claim 7 wherein said ring-shaped separator includes:
   a radial face; and
   third and fourth axially projecting flanges;
   said first and fourth flanges projecting axially a distance greater than half of the major diameter of said rolling elements.

9. The bearing of claim 8 wherein;
   said roller receiving slots have a uniform width and height; and
   said rolling elements have spherical ends, and a major diameter and height larger than the width and height of said slots, respectively, whereby a unitized bearing is provided.

10. A cup and grease retained unitized thrust bearing for use in an automotive automatic transmission comprising:
   a first generally flat annular race having inner and outer diameters;
   a generally flat annular unitized type roller separator having inner and outer diameters;
   a plurality of roller receiving openings disposed in said annular roller separator;
   a plurality of rolling elements disposed in said roller receiving openings;
   an annular deformable cup rotatably securing said first annular race and said annular roller separator, with said rolling elements retained therebetween;
   a second generally flat annular race having inner and outer diameters;
   a coat of fibrous, tacky, adhesive-like grease, said grease being compatible with the working fluid of an automotive automatic transmission, said grease being disposed between said second annular race and said annular roller separator for adhesively securing said second annular race to said annular roller separator and said rolling elements, thereby forming a stable assembly for shipping and handling of the bearing.

11. A cup and grease retained unitized thrust bearing for use in an automotive automatic transmission comprising:
   a first generally flat annular race having inner and outer diameters;
   a first axially projecting flange disposed on the outer diameter of said first annular race;
   a generally flat annular roller separator having inner and outer diameters;
   a radially projecting flange disposed on the outer diameter of said annular roller separator;
   a plurality of roller receiving openings disposed in said annular roller separator;
   a plurality of rolling elements larger than said roller receiving openings;
   an annular deformable cup, C-shaped in cross section, said cup being deformed about said first axially projecting flange and engaging said radially projecting flange, said annular roller separator thereby being rotatably mounted on said first annular race with said rolling elements retained therebetween;
   a second generally flat annular race having inner and outer diameters;
   a second axially projecting flange disposed on the inner diameter of said second annular race; and
   a coat of fibrous, tacky, adhesive-like grease, said grease being compatible with the working fluid of an automotive transmission, said grease being disposed between said second annular race and said annular roller separator for adhesively securing said second annular race to said annular roller separator and said rolling elements, thereby forming a stable assembly for shipping and handling of the bearing.

12. The bearing of claim 11 wherein said annular roller separator comprises:
   a cage;
   said cage including first and second ring-shaped cage halves;
   said cage halves including first and second radially extending faces;
   a plurality of roller receiving openings radially disposed in an angularly spaced relationship about said first and second faces;
   said rolling elements being larger than said roller receiving openings; and
   said cage halves being joined with said first and second faces in an axially spaced relationship with said rolling elements retained therebetween, and extending through said roller receiving openings.

13. The bearing of claim 11 wherein said annular roller separator comprises:
   a ring-shaped separator member;
   said ring-shaped separator member having a channel-shaped cross section; and
   a plurality of roller receiving slots radially disposed in an angularly relationship about said ring-shaped separator member.

14. The bearing of claim 13 wherein said ring-shaped separator comprises:
   a radial face; and
   third and fourth axially projecting flanges;
   said third and fourth flanges projecting axially a distance greater than half of the major diameter of said rolling elements.

15. The bearing of claim 14 wherein said roller receiving slots have a uniform width and height; and
   said rolling elements have spherical ends, and a major diameter and height larger than the width and height of said slots, respectively, whereby a unitized bearing is provided.

16. The bearing of claim 1, 2, 5, 10, or 11 wherein said grease comprises a Sodium soap base grease.

17. The bearing of claim 16 wherein said grease comprises a mineral oil grease.

18. The bearing of claim 17 wherein said grease is composed of approximately 18% by weight Sodium base soap and approximately 81% by weight mineral oil.

19. The bearing of claim 18 wherein the mineral oil has a pour point of 30° F.

20. The bearing of claims 1, 2, 5, 10, or 11 wherein said grease remains sufficiently tacky at 150° F. to provide a stable bearing assembly for shipping and handling.

21. The bearing of claims 1, 2, 5, 10, or 11 wherein said grease has a dropping point of approximately 425° F. and a worked penetration of approximately 230 at 77° F.

* * * * *